(No Model.)
I. W. ARCHIBALD.
FENCE.
No. 321,171. Patented June 30, 1885.
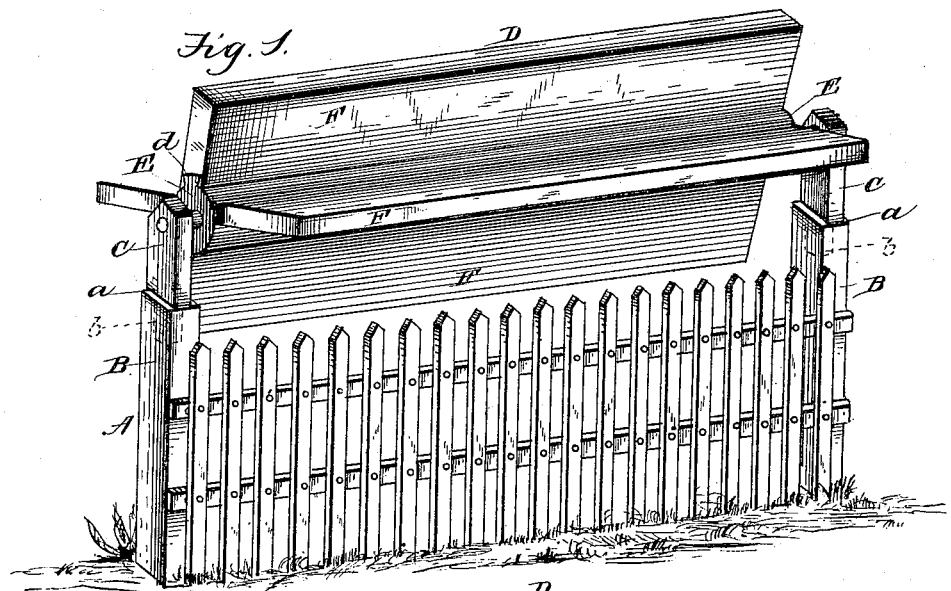
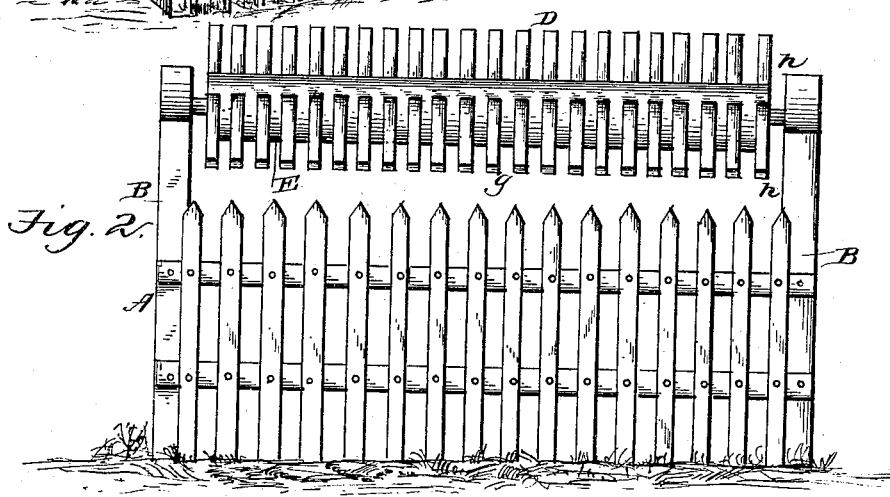
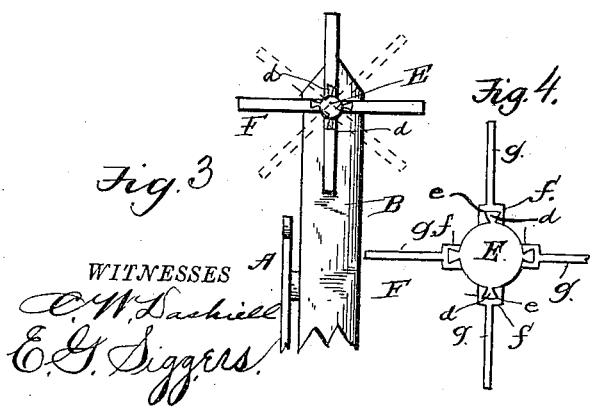
WITNESSES
C. W. Dashiell
E. G. Siggers
I. W. Archibald
INVENTOR
By C. A. Snow & Co.
Attorneys

UNITED STATES PATENT OFFICE.

ISAAC W. ARCHIBALD, OF ELGIN, ILLINOIS.

FENCE.

SPECIFICATION forming part of Letters Patent No. 321,171, dated June 30, 1885.

Application filed September 10, 1884. (No model.)

*To all whom it may concern:*

Be it known that I, ISAAC W. ARCHIBALD, a citizen of the United States, residing at Elgin, in the county of Kane and State of Illinois, have invented a new and useful Improvement in Fences, of which the following is a specification, reference being had to the accompanying drawings.

This invention relates to fences; and it has for its object to provide an oscillating, tilting, or revolving attachment to the same, which will exclude from or keep in a yard or inclosure hens, turkeys, dogs, cats, foxes, and other animals which first fly or jump onto the fence before leaping over, the attachment operating in such a manner that should the animal fly or leap onto the fence it will alight on the attachment, the latter turning or revolving and causing it to fall back into or out of the yard.

With these objects in view the said invention consists in certain details of construction and combination of parts, as hereinafter set forth, and particularly pointed out in the claims.

In the accompanying drawings, Figure 1 is a perspective view of a fence with my attachment applied thereto, the latter being in the form of a reel. Fig. 2 is a front view showing another form of reel. Fig. 3 is a detail view of a portion of the fence and the attachment, showing the operation of the latter in dotted lines, the revolving reel being employed. Fig. 4 is an end view showing the wings of the reel provided with fingers or bars.

Like letters refer to corresponding parts in the several figures.

Referring to the drawings, A designates the fence, of any suitable construction, having the usual rails and posts. The posts B B are mortised at their upper ends at $a$, to receive a tenon, $b$, on the lower end of the uprights or standards C C, the latter projecting upward above the fence.

D designates a revolving reel comprising a suitable shaft, E, having dovetail projections $d\ d$, four in number, extending along the length of the same at equal distances apart, the radial wings F F, also four in number, having corresponding dovetail grooves, $e\ e$, at their inner ends to receive the projections of the shaft. The wings extend outward in opposite directions, and may be increased in number; but I prefer the arrangement shown. The shaft E has its ends journaled in the upper ends of the standards, the wings being slid in place on the shaft and projecting radially outward, so that should a hen or cat alight on any one of the wings its weight will cause the shaft to turn or revolve, thus precipitating the animal back into or out of the yard.

In place of the plain wings I may substitute the wings shown in Fig. 4, which consist of an inner plain portion, $f$, provided with the dovetail groove $e$, fingers $g$ projecting outward from the inner portion.

It will be seen that by means of the tongue-and-groove connection of the wings with the shaft, the wings illustrated in Figs. 1 and 3 may be detached, and the ones shown in Fig. 4 substituted in place thereof. In this manner, should the wings become broken or otherwise made inoperative, they can be readily replaced by a new set. The wings with the fingers are the most desirable, since they can be constructed lighter, and, besides, make a more presentable appearance. Again, when a plain wing is employed, the animal or fowl when alighting on the same may get a sufficient landing to leap over the inclosure before the reel can act, but by means of the fingers the latter will not afford such a landing, and the animal will find itself unable to stand. Furthermore, since the fingers make the wings lighter, the reel will act more readily under the preponderance of the weight of the animal.

In Fig. 2 I have shown another form of reel, consisting of a shaft, E, having fingers $g$ secured thereto, and projecting outwardly, and arranged in rows $h$, the latter extending in opposite directions. The ends of the shaft $g$ are journaled in the uprights or standards C, so as to suspend the reel above the rails or pickets of the fence.

The operation of my invention will be readily understood from the foregoing description, taken in connection with the annexed drawings.

The reels are attached to each section of the fence, and are arranged in the manner shown. Should an animal in leaping or flying over the fence alight on the wings of the reel, its weight will preponderate and cause the reel to turn or revolve, the animal being precipitated back from whence it came. In this manner the attachment will operate to keep hens, turkeys, and other fowl within an inclosure, and exclude dogs, cats, foxes, and other animals from leaping over the fence into the inclosure.

My attachment is hung in such a manner that the fowl or animal must alight on it, and not on the fence, as heretofore. Thus it will operate in every instance to precipitate the object back into or out of the yard.

The device may be applied to the various forms of fences, where it will prove a simple, inexpensive, and efficient attachment for the purposes intended.

Having described my invention, I claim—

1. The combination, with the posts of a fence provided with extensions, of the hereinbefore described reel attachment, comprising the shaft E, having the longitudinal dovetail projections $d$, and the wings having the inner ends dovetailed at $e$, to receive the projections of the shaft, as and for the purpose set forth.

2. The combination, with the posts of a fence having extensions, of the reel attachment comprising the shaft E and the radial wings attached to the same, and having a series of fingers or bars, as and for the purpose set forth.

In testimony that I claim the foregoing as my own I have hereto affixed my signature in presence of two witnesses.

ISAAC W. ARCHIBALD.

Witnesses:
C. S. KILBOURNE,
E. LEW GILBERT.